(12) United States Patent
Sutardja

(10) Patent No.: US 7,585,542 B2
(45) Date of Patent: Sep. 8, 2009

(54) GLASSY METAL DISK

(75) Inventor: Sehat Sutardja, Los Altos Hills, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 11/801,058

(22) Filed: May 8, 2007

(65) Prior Publication Data

US 2007/0212497 A1 Sep. 13, 2007

Related U.S. Application Data

(62) Division of application No. 10/866,326, filed on Jun. 9, 2004.

(60) Provisional application No. 60/555,806, filed on Mar. 24, 2004.

(51) Int. Cl.
B05D 5/00 (2006.01)

(52) U.S. Cl. .................................................. 427/131

(58) Field of Classification Search ................ 427/585, 427/131; 428/846, 900, 800, 810, 811.2, 428/812, 814, 818, 819, 823, 823.2, 827, 428/832.4, 836.1, 846.9, 846.6, 846.8, 813; 360/970, 97.01; 365/50, 55, 87, 97, 161, 365/173; 29/603.13, 603.21, 604, 737, DIG. 95, 29/DIG. 28; 205/89

See application file for complete search history.

(56) References Cited

U.S. PATENT DOCUMENTS

| 4,365,005 | A | * | 12/1982 | Witt et al. ................ 428/611 |
|---|---|---|---|---|
| 4,698,716 | A | | 10/1987 | Lazzari |
| 5,216,631 | A | | 6/1993 | Sliwa, Jr. |
| 5,307,311 | A | | 4/1994 | Sliwa, Jr. |
| 5,466,524 | A | * | 11/1995 | Hoshi et al. .............. 428/336 |
| 5,626,943 | A | * | 5/1997 | Tenhover .................. 428/141 |
| 5,700,593 | A | * | 12/1997 | Okumura et al. ......... 428/831.2 |
| 5,916,656 | A | | 6/1999 | Kitayama et al. |
| 5,968,627 | A | | 10/1999 | Nigam et al. |
| 6,014,296 | A | | 1/2000 | Ichihara et al. |
| 6,022,609 | A | | 2/2000 | Gao et al. |
| 6,030,681 | A | | 2/2000 | Czubarow et al. |
| 6,054,786 | A | | 4/2000 | Springer |
| 6,066,909 | A | | 5/2000 | Springer et al. |
| 6,084,849 | A | | 7/2000 | Durig et al. |
| 6,169,354 | B1 | | 1/2001 | Springer et al. |

(Continued)

FOREIGN PATENT DOCUMENTS

JP 59-127226 7/1984

(Continued)

OTHER PUBLICATIONS

Official Communication from the European Patent Office dated Mar. 7, 2007 for Application No. 05 004 127.6-1217; 4 pages.

(Continued)

*Primary Examiner*—Michael Cleveland
*Assistant Examiner*—Tabassom Tadayyon Eslami

(57) ABSTRACT

A method of making a hard disk drive platter comprises providing a substrate having first and second surfaces; arranging a strengthening layer including glassy metal on at least one of the first and second surfaces; and arranging at least one magnetic layer on at least one of the substrate and the strengthening layer.

17 Claims, 5 Drawing Sheets

U.S. PATENT DOCUMENTS

| | | |
|---|---|---|
| 6,183,889 B1 | 2/2001 | Koshiba et al. |
| 6,204,588 B1 | 3/2001 | Springer |
| 6,205,052 B1* | 3/2001 | Slaughter et al. ............ 365/173 |
| 6,432,563 B1* | 8/2002 | Zou et al. ................... 428/826 |
| 6,838,188 B1* | 1/2005 | Wong ........................ 428/831 |
| 6,872,478 B2* | 3/2005 | Bian et al. ................. 428/831 |
| 2002/0048693 A1 | 4/2002 | Tanahashi et al. |
| 2002/0129923 A1 | 9/2002 | Liebermann et al. |
| 2002/0194468 A1 | 12/2002 | Betts-LaCroix et al. |
| 2003/0118871 A1 | 6/2003 | Hosoe et al. |
| 2003/0134151 A1* | 7/2003 | Usuki et al. ................. 428/693 |
| 2003/0194583 A1* | 10/2003 | Miyamoto ............ 428/694 SG |
| 2003/0211361 A1 | 11/2003 | Kim et al. |
| 2004/0038082 A1 | 2/2004 | Tsumori |
| 2004/0043257 A1 | 3/2004 | Doushita et al. |
| 2004/0163273 A1* | 8/2004 | Tei et al. ....................... 34/92 |

FOREIGN PATENT DOCUMENTS

| | | |
|---|---|---|
| JP | 64-67713 | 3/1989 |
| WO | WO 0074207 A1 | 12/2000 |

OTHER PUBLICATIONS

Behme et al; "Phase Velocity Measurement", 1998 IEEE Ultrasonic Symposium; p. 127-130.

Metglas 2705M Data Sheet; Metaglas Inc.; Aug. 10, 2004; www.metglas.com; 7 pages.

L.A. French et al.: "A Metallic Glass Surface Acoustic Wave Device", IEEE Ultrasonics Symposium Proceedings, vol. 1, 2002, pp. 127-130.

Communication dated May 17, 2005 for the European Search Report Application No. 05004127.6.

Brad Lemley, "Glassy Metal", Discover Science, Technology, and Medicine, pp. 46-51, Apr. 2004.

Official Communication from the EPO dated Jun. 6, 2006 for Application No. 05 004 127.6-1217; 4 pages.

* cited by examiner

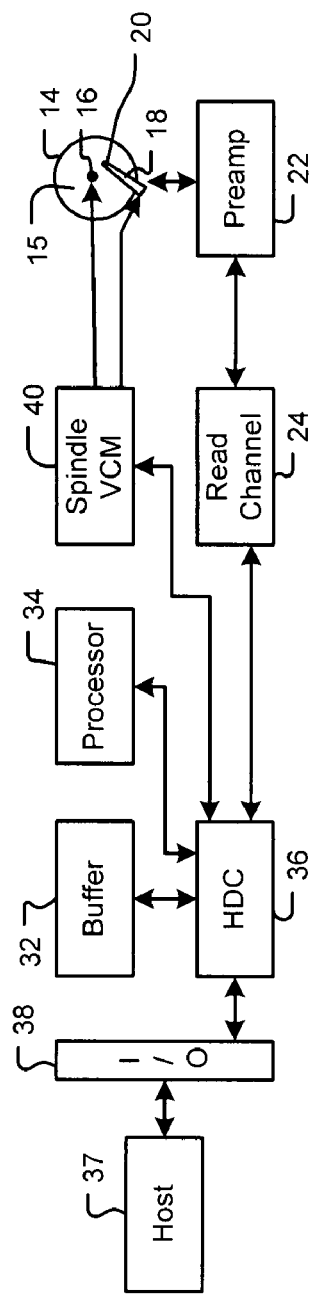
FIG. 1
_Prior Art_
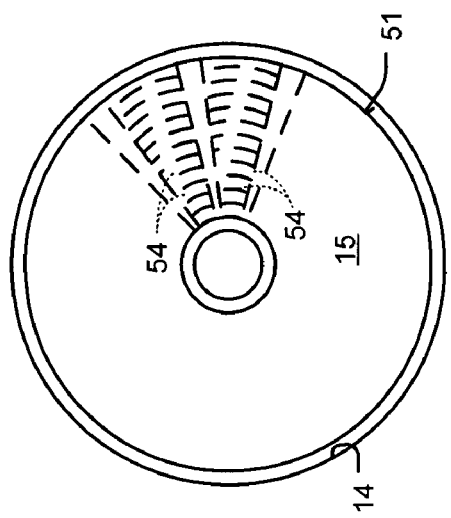
FIG. 2
_Prior Art_

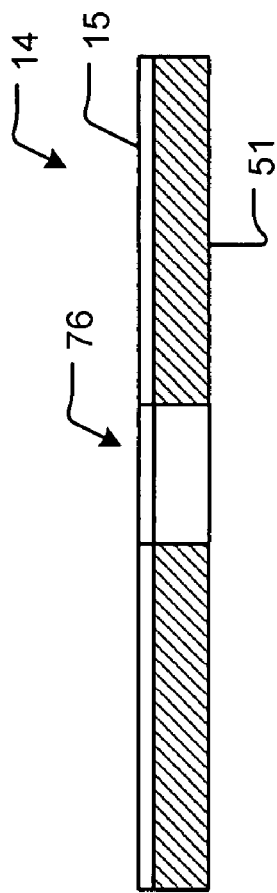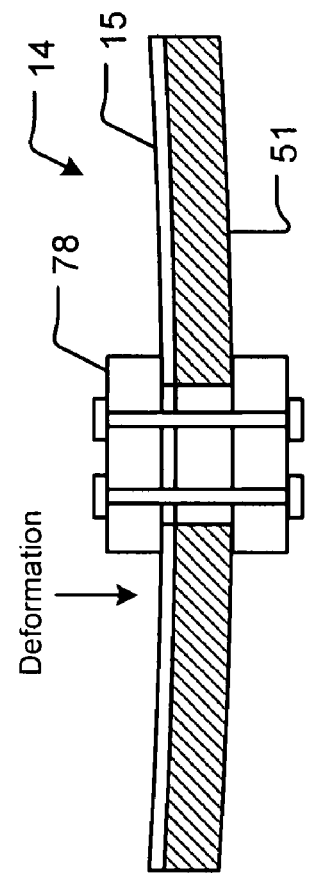

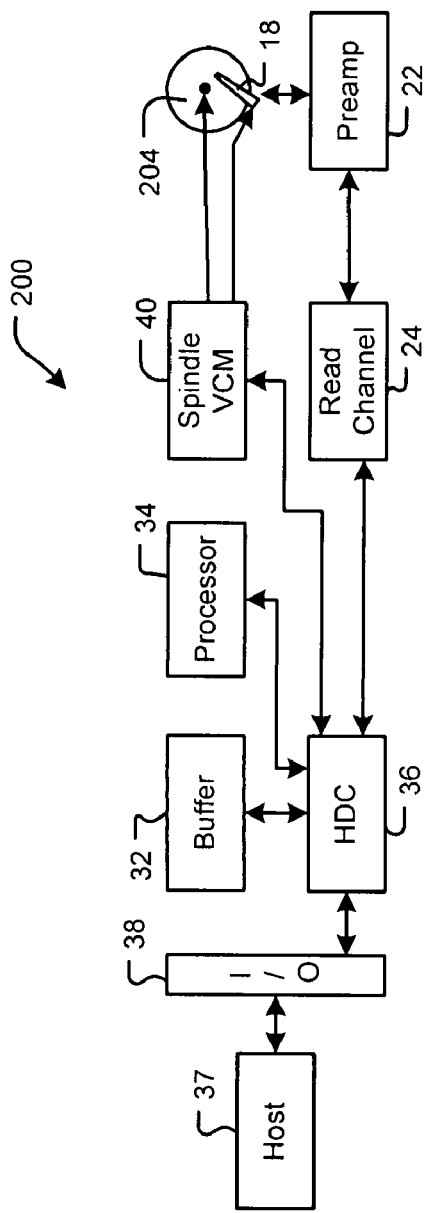
FIG. 10
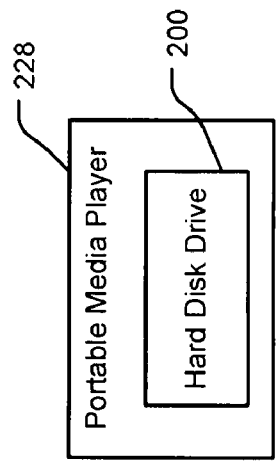
FIG. 13
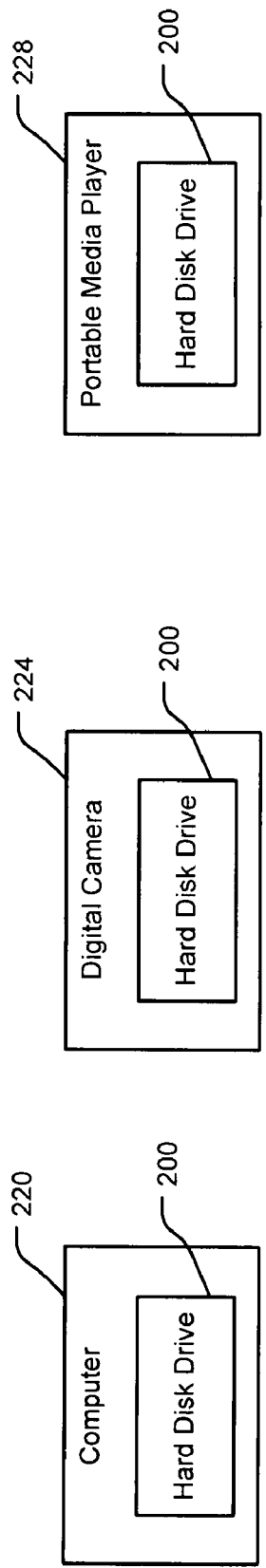
FIG. 12
FIG. 11

GLASSY METAL DISK

CROSS-REFERENCE TO RELATED APPLICATIONS

This application is a divisional of U.S. Ser. No. 10/866,326, filed Jun. 9, 2004, which application claims the benefit of U.S. Provisional Application No. 60/555,806, filed on Mar. 24, 2004. The disclosures of the above applications are hereby incorporated by reference in their entirety.

FIELD OF THE INVENTION

The present invention relates to hard disk drives, and more particularly to hard drive platters including glassy metal.

BACKGROUND OF THE INVENTION

Electronic devices such as computers, laptops, personal video recorders (PVRs), MP3 players, game consoles, set-top boxes, digital cameras, and other electronic devices often need to store a large amount of data. Storage devices such as hard disk drives (HDD) may be used to meet these storage requirements. One goal of HDD designers is to reduce data access times, increase storage density and/or reduce power consumption of the HDDs.

Referring now to FIG. 1, an exemplary data storage architecture 10 is shown and includes one or more hard drive platters 14 that are coated with magnetic layers 15. The magnetic layers 15 store positive and negative magnetic fields that represent binary 1's and 0's. A spindle motor, which is shown schematically at 16, rotates the platter 14. Generally the spindle motor 16 rotates the hard drive platter 14 at a fixed speed during read/write operations. One or more read/write actuator arms 18 move relative to the platter 14 to read and/or write data to/from the hard drive platters 14.

A read/write device 20 is located near a distal end of the read/write arm 18. The read/write device 20 includes a write element such as an inductor that generates a magnetic field. The read/write device 20 also includes a read element (such as a magneto-resistive (MR) element) that senses the magnetic field on the platter 14. A preamp circuit 22 amplifies analog read/write signals.

When reading data, the preamp circuit 22 amplifies low level signals from the read element and outputs the amplified signal to a read/write channel device 24. When writing data, a write current is generated which flows through the write element of the read/write device 20. The write current is switched to produce a magnetic field having a positive or negative polarity. The positive or negative polarity is stored by the hard drive platter 14 and is used to represent data.

A buffer 32 stores data that is associated with the control of the hard disk drive and/or buffers data to allow data to be collected and transmitted as larger data blocks to improve efficiency. The buffer 32 may employ SDRAM or other types of low latency memory. A processor 34 performs processing that is related to the operation of the hard disk drive 10. A hard disk controller (HDC) 36 communicates with a host 37 via an input/output (I/O) interface 38. The HDC 36 also communicates with a spindle/voice coil motor (VCM) driver 40 and/or the read/write channel device 24. The I/O interface 38 can be a serial or parallel interface, such as an Integrated Drive Electronics (IDE), Advanced Technology Attachment (ATA), or serial ATA (SATA) interface. The spindle/VCM driver 40 controls the spindle motor 16, which rotates the platter 14. The spindle/VCM driver 40 also generates control signals that position the read/write arm 18, for example using a voice coil actuator, a stepper motor or any other suitable actuator.

Referring now to FIG. 2, the hard drive platter 14 includes a substrate 51 having the magnetic layers 15 that store data in a nonvolatile manner. The magnetic layers 15 are divided into tracks 54, which include concentric circular sections. The tracks 54 are divided radially into sectors. The magnetic layers 15 are typically coated on the substrate 51 using bonding, sintering, electroplating, sputtering, deposition, spraying and/or other techniques. A protective layer (not shown) may also be added to protect the platter 14 from scratches and/or debris.

The substrate 51 is preferably durable, lightweight, inflexible, and heat resistant. The substrate 51 should resist warping due to heat, high rotational speeds and/or vibration during use. The platters 14 are typically constructed from aluminum alloy or glass, although other materials may be used.

If an aluminum alloy platter is constructed too thin, it is susceptible to deformation, which may cause wobbling during rotation. During high-speed rotation, the aluminum alloy platter may expand. Additionally, clamping the aluminum alloy platter to the spindle motor may cause deformation. Referring now to FIGS. 3A and 3B, the hard drive platter 14 is shown to include the substrate 51 and the magnetic layers 15 formed on at least one surface thereof. A central bore 76 receives a clamping device 78, associated with the spindle motor 16. The clamping device 78 may cause the hard drive platter 70 to deform either downwardly (as shown) or upwardly.

Glass hard drive platters are not as susceptible to deformation due to high-speed rotation. Therefore, glass hard drive platters can be thinner and lighter than those constructed from aluminum alloy. As a result, data storage devices that use glass platters may be equipped with a smaller motor that requires less power, and is therefore more efficient. Glass platters, however, are more expensive to manufacture than aluminum alloy platters. Additionally, glass cannot be injection-molded and must be cut, which increases the cost to produce the platters.

SUMMARY OF THE INVENTION

A hard drive platter comprises a substrate that includes glassy metal. At least one magnetic layer is arranged on the substrate.

In other features, the glassy metal includes an alloy with three or more elements that differ in atomic size by at least 12%. The glassy metal includes at least three of zirconium, titanium, nickel, copper, and/or beryllium.

In still other features, the substrate is injection molded. The glassy metal is substantially amorphous. The glassy metal is greater than or equal to approximately 80% amorphous and less than or equal to approximately 20% crystalline.

In other features, a perpendicular recording system comprises the hard drive platter. A hard disk drive comprises the hard drive platter. A computer comprises the hard disk drive. A digital camera comprises the hard disk drive. A portable media player comprises the hard disk drive.

In other features, an aluminum layer is arranged between the glassy metal substrate and the at least one magnetic layer.

In other features, an insulating layer is arranged between the glassy metal substrate and the at least one magnetic layer. The insulating layer includes glass and/or Silicon Nitride. The insulating layer is deposited on the glassy metal substrate. The insulating layer is deposited on the glassy metal substrate using chemical vapor deposition.

A hard drive platter comprises a substrate. A strengthening layer is arranged on at least one surface of the substrate. The strengthening layer includes glassy metal. A magnetic layer is formed on at least one of the substrate and the strengthening layer.

In other features, the glassy metal includes three or more elements that differ in atomic size by at least 12%. The glassy metal includes at least three of zirconium, titanium, nickel, copper, and/or beryllium. The substrate includes glass and/or aluminum alloy. The glassy metal is substantially amorphous. The glassy metal is greater than or equal to approximately 80% amorphous and less than or equal to approximately 20% crystalline.

In other features, a perpendicular recording system comprises the hard drive platter. A hard disk drive comprises the hard drive platter. A computer comprises the hard disk drive. A digital camera comprises the hard disk drive. A portable media player comprises the hard disk drive.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a functional block diagram illustrating an exemplary data storage device according to the prior art;

FIG. 2 illustrates a hard drive platter according to the prior art;

FIG. 3A is a cross-sectional view of the hard drive platter of FIG. 2 according to the prior art;

FIG. 3B illustrates deformation of the hard drive platter of FIG. 3B due to clamping;

FIG. 10 is a functional block diagram of exemplary hard disk drive including the hard drive platters according to FIGS. 4, 6, and/or 8;

FIG. 11 is a functional block diagram of a computer including hard disk drive of FIG. 10;

FIG. 12 is a functional block diagram of a digital camera including hard disk drive of FIG. 10; and FIG. 13 is a functional block diagram of a portable media player including hard disk drive of FIG. 10.

DETAILED DESCRIPTION OF THE PREFERRED EMBODIMENTS

Figure 6:
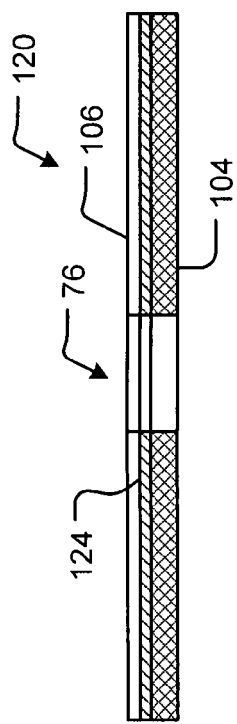
FIG. 6 is a cross-sectional view of a hard drive platter that is similar to FIG. 4 and that includes an aluminum and/or aluminum alloy layer that is located between the glassy metal substrate and the magnetic layers according to the present invention.

The following description of the preferred embodiment(s) is merely exemplary in nature and is in no way intended to limit the invention, its application, or uses. For purposes of clarity, the same reference numbers will be used in the drawings to identify similar elements.

The present invention improves data storage devices by forming the hard drive platter using a glassy metal substrate. Alternately, a less costly substrate material such as glass, metal, and/or an alloy can be coated with a layer of the glassy metal to increase the strength and rigidity of the substrate material.

As used herein, the term "glassy metal" refers to an alloy that combines three or more elements that differ in atomic size by at least 12%. For example, the glassy metal can include an alloy of zirconium, titanium, nickel, copper, and/or beryllium. In one embodiment, the glassy metal is Vitreloy® and/or Liquidmetal2® available from Liquidmetal Technologies of Lake Forest, Calif. Vitreloy® is predominantly amorphous or glassy. Liquidmetal2®, however, is approximately 80% glassy and 20% crystalline.

As used herein, "coating" refers to bonding, sintering, electroplating, sputtering, spraying, depositing and/or other suitable methods of applying the glassy metal to a non-glassy metal substrate and/or magnetic layers to a glassy metal substrate, a non-glassy metal substrate, and/or a glassy metal strengthening layer.

Figure 4:
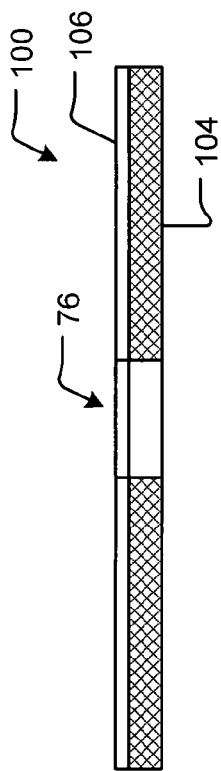
FIG. 4 is a cross-sectional view of a hard drive platter that includes a glassy metal substrate and magnetic layers according to the present invention.

Referring now to FIG. 4, a hard drive platter 100 includes a substrate 104 that includes glassy metal. One or more surfaces of the substrate 104 are coated with magnetic layers 106, which magnetically store data during use. As can be appreciated, the hard drive platter 100 can be formed thinner than conventional hard drive platters and can be rotated faster without deformation. The hard drive platter 100 can also be rotated using a spindle motor 16 that dissipates less power than a corresponding conventional hard drive platter due to the decreased weight and increased strength. The higher rotational speeds also reduce data access times. Furthermore, the overall weight of devices including the hard disk drive with the glassy metal platter is reduced, which is advantageous in portable applications such as laptop computers, personal digital assistants, digital cameras, portable media players, notebooks, and the like.

Figure 5:
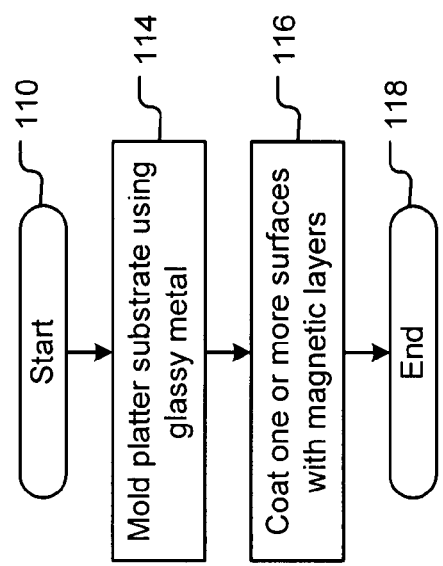
FIG. 5 illustrates steps of an exemplary method for making the hard drive platter of FIG. 4.

Referring now to FIG. 5, exemplary steps for making the hard drive platter 100 in FIG. 3 are shown. The method starts at step 110. In step 114, the hard drive platter substrate 104 is molded using the glassy metal. In step 116, one or more surfaces of the substrate 104 are coated with the magnetic layers 106. The method ends with step 118.

Referring now to FIG. 6, an alternate hard drive platter 120 is shown to include the glassy metal substrate 104. An Aluminum and/or Aluminum alloy layer 124 is formed on the glassy metal substrate 104. The magnetic layers 106 are formed on the Aluminum and/or Aluminum alloy layer 124.

Figure 7:
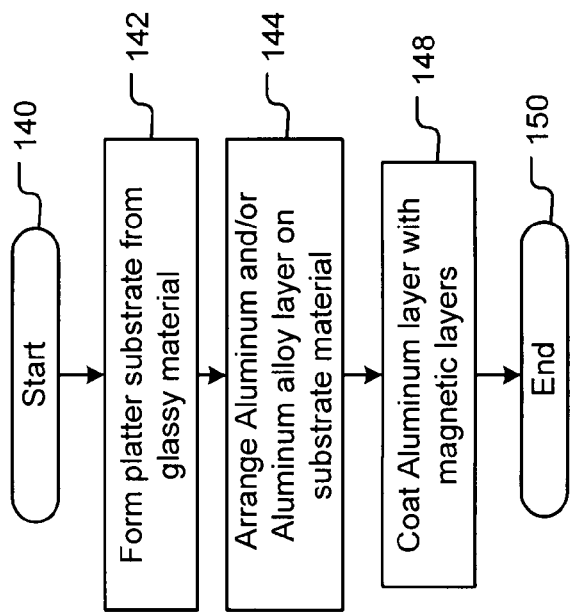
FIG. 7 illustrates steps of an exemplary method for making the hard drive platter of FIG. 6.

Referring now to FIG. 7, exemplary steps for making the hard drive platter 120 in FIG. 6 are shown. The method starts at step 140. In step 142, the hard drive platter substrate 104 is formed using the glassy metal. In step 144, the Aluminum and/or Aluminum alloy layer 124 is arranged on the glassy metal substrate 104. In step 148, the Aluminum and/or Aluminum alloy layer 124 is coated with the magnetic layers 106. The method ends with step 150.

Figure 8:
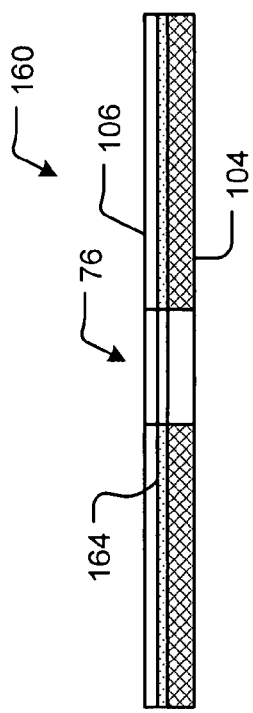
FIG. 8 is a cross-sectional view of a hard drive platter that is similar to FIG. 4 and that includes an insulating layer that is located between the glassy metal substrate and the magnetic layers according to the present invention.

Referring now to FIG. 8, an alternate hard drive platter 160 is shown to include the glassy metal substrate 104. An insulating layer 164 is formed on the glassy metal substrate 104.

The metal coating layers 106 are formed on the insulating layer 164. The insulating layer 164 may include glass, Silicon Nitride ($SiNi_x$), and/or other suitable insulating material. Preferably, the insulating material 164 is robust enough to handle physical stress encountered during use as well as stress encountered during manufacturing of the hard drive platter 160. For example, the insulating material 164 can be deposited onto the glassy metal substrate 104. One suitable method for depositing the insulating layer 164 includes chemical vapor deposition (CVD).

Figure 9:
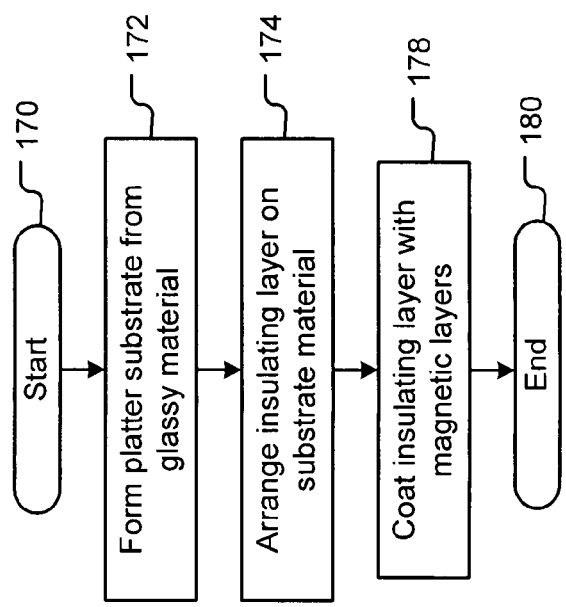
FIG. 9 illustrates steps of an exemplary method for making the hard drive platter of FIG. 8.

Referring now to FIG. 9, exemplary steps for making the hard drive platter 160 in FIG. 8 are shown. The method starts at step 170. In step 172, the hard drive platter substrate 104 is formed using the glassy metal. In step 174, the insulating layer 164 is arranged on the glassy metal substrate 104. In step 176, the insulating layer 164 is coated with the magnetic layers 106. The method ends with step 180.

An alternate hard drive platter includes a substrate, which can include glass, metal and/or an alloy. The alloy can be aluminum alloy. One or more surfaces of the substrate are coated with a glassy metal. The glassy metal and/or the substrate are coated with the magnetic layers. As can be appreciated, the hard drive platter can also be formed thinner and/or rotated faster than conventional hard drive platters without deformation. The hard drive platter can also be rotated using a lower power spindle motor, which dissipates less power. The higher rotational speed also reduces data access times.

Exemplary steps for making the hard drive platter include forming the hard drive platter substrate from a material. The material can include glass, metal and/or an alloy. The alloy can be aluminum alloy. One or more surfaces of the substrate are coated with glassy metal. One or more surfaces of the glassy metal and/or the substrate are coated with the magnetic layers.

As can be appreciated, while the glassy metal is coated, formed and/or arranged on upper and lower surfaces of the substrate, the glassy metal can be coated, formed and/or arranged on the upper and/or lower surface. The magnetic layers may be coated, formed and/or arranged on the substrate and/or on the glassy metal. For example, the glassy metal can be coated on the lower surface of the substrate and the magnetic layers can be coated on the upper surface of the substrate or vice, versa.

Due to the strength of glassy metal, glassy metal hard drive platters and/or glassy metal-coated substrates can be constructed thinner and lighter than conventional hard drive platters. Hard disk drives furnished with glassy metal platters and/or glassy metal-coated substrates can use smaller motors and/or operate at a higher power efficiency. Further, the hard disk drives can rotate glassy metal platters and/or glassy metal-coated substrates at higher speeds without the risk of deformation. Faster platter rotational speeds translates into reduced access time for read/write operations for the hard disk drive. Furthermore, the overall weight of devices including the hard disk drive with the glassy metal platter is reduced, which is advantageous in portable applications such as laptop computers, personal digital assistants, digital cameras, portable media players, notebooks, and the like.

Glassy metal material can also be injection molded for glassy metal platters. Therefore, manufacturing costs may be reduced by providing injection molded hard drive platters. An injection-molded hard drive platter will be closer to the final shape immediately, without requiring additional cutting or shaping such as with glass hard drive platters. As can be appreciated, the hard drive platter may be particularly useful in perpendicular recording systems. Glassy metals are less lossy, which increases the efficiency of a flux path therethrough during writing. In other words, the flux path travels from one end of the write element through the magnetic layer and substrate and back through the substrate and magnetic layer to the opposite end of the write element. The increased efficiency may allow closer spacing of data and/or increased storage capacity. As can be appreciated, while the hard drive platters are described in conjunction with molding and/or coating steps, other methods of manufacture may be used to manufacture the glassy metal without departing from the present invention.

Referring now to FIG. 10, a hard disk drive 200 that is similar to the hard disk drive in FIG. 1 is shown. The hard disk drive 200 includes a hard drive platter 204 that is made according to the present invention.

Referring now to FIGS. 11-13, additional exemplary implementations of the hard disk drive according to the present invention are shown. In FIG. 11, a computer 220 includes the hard disk drive 200 of FIG. 10. The computer 220 may be a laptop computer, a notebook, a desktop computer, a personal digital assistant, or any other type of computer. In FIG. 12, a digital camera 224 includes the hard disk drive 200 of FIG. 10. In FIG. 13, a portable media player 228 includes the hard disk drive 200 of FIG. 10.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of making a hard disk drive platter, comprising:
   providing a substrate having first and second surfaces and that includes a glassy metal layer;
   arranging a strengthening layer on at least one of the first and second surfaces; and
   arranging at least one magnetic layer on at least one of the substrate and the strengthening layer;
   wherein said substrate consists of a single layer.

2. The method of claim 1 wherein the glassy metal layer includes three or more elements that differ in atomic size by at least 12%.

3. The method of claim 2 wherein the glassy metal layer includes at least three of zirconium, titanium, nickel, copper, and beryllium.

4. The method of claim 2 wherein the glassy metal layer includes zirconium, titanium, nickel, copper, and beryllium.

5. The method of claim 4 wherein the glassy metal layer is greater than or equal to approximately 80% amorphous and less than or equal to approximately 20% crystalline.

6. The method of claim 1 wherein the substrate includes glass.

7. The method of claim 1 wherein the substrate includes aluminum alloy.

8. The method of claim 1 wherein the step of arranging the strengthening layer includes coating the strengthening layer on the at least one of the first and second surfaces.

9. The method of claim 1 wherein the step of arranging the at least one magnetic layer includes coating the at least one magnetic layer on the at least one of the substrate and the strengthening layer.

10. The method of claim 1 wherein said strengthening layer includes glassy metal.

11. A method of making a hard disk drive platter, comprising:

providing a substrate that includes a glassy metal layer; and
arranging at least one magnetic layer on the substrate,
wherein the hard disk drive platter includes an opening that receives a hard disk drive spindle,
wherein said substrate consists of a single layer.

12. The method of claim 11 wherein the glassy metal layer includes an alloy with three or more elements that differ in atomic size by at least 12%.

13. The method of claim 12 wherein the glassy metal layer includes at least three of zirconium, titanium, nickel, copper, and beryllium.

14. The method of claim 12 wherein the glassy metal layer includes zirconium, titanium, nickel, copper, and beryllium.

15. The method of claim 11 wherein the substrate is injection molded.

16. The method of claim 11 wherein the glassy metal layer is greater than or equal to approximately 80% amorphous and less than or equal to approximately 20% crystalline.

17. The method of claim 11 wherein the step of arranging the at least one magnetic layer includes coating the at least one magnetic layer on the substrate.

* * * * *